United States Patent
Tarte

(10) Patent No.: US 10,059,285 B2
(45) Date of Patent: Aug. 28, 2018

(54) DEVICE AND/OR SYSTEM DEACTIVATION FOR ENERGY EFFICIENCY IMPROVEMENTS IN VEHICLE

(71) Applicant: Toyota Motor Engineering & Manufacturing North America, Inc., Erlanger, KY (US)

(72) Inventor: Christopher T. Tarte, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 44 days.

(21) Appl. No.: 15/194,749

(22) Filed: Jun. 28, 2016

(65) Prior Publication Data

US 2017/0369010 A1    Dec. 28, 2017

(51) Int. Cl.
| | | |
|---|---|---|
| *B60R 16/023* | (2006.01) | |
| *G05B 15/02* | (2006.01) | |
| *B60W 30/165* | (2012.01) | |
| *B60R 16/03* | (2006.01) | |

(52) U.S. Cl.
CPC ......... *B60R 16/0236* (2013.01); *B60R 16/03* (2013.01); *B60W 30/165* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 6,718,214 B1 | 4/2004 | Schoettle et al. | |
| 2005/0243449 A1* | 11/2005 | Pavao | B60Q 1/2665 359/877 |
| 2011/0153141 A1* | 6/2011 | Beechie | B60R 16/0236 701/31.4 |
| 2011/0160991 A1* | 6/2011 | Crombez | B60W 30/182 701/123 |
| 2014/0278019 A1* | 9/2014 | Be | F02D 29/02 701/112 |
| 2015/0348335 A1* | 12/2015 | Ramanujam | G07C 5/006 701/23 |
| 2016/0054735 A1* | 2/2016 | Switkes | G08G 1/22 701/23 |

\* cited by examiner

*Primary Examiner* — Lail A Kleinman
(74) *Attorney, Agent, or Firm* — Christopher G. Darrow; Darrow Mustafa PC

(57) ABSTRACT

A computing system for a vehicle is provided. The computing system includes one or more processors for controlling operation of the computing system, and a memory for storing data and program instructions usable by the one or more processors. The processors are configured to execute instructions stored in the memory to determine if a vehicle fuel level or battery power level is below a predetermined threshold. If the vehicle fuel level or battery power level is below the threshold, it is determined if at least one energy conservation measure has been pre-selected by a user. If at least one energy conservation measure has been pre-selected by a user, it is determined whether or not a user approves implementation of the at least one energy conservation measure. If a user approves implementation of the at least one energy conservation measure, the at least one energy conservation measure is implemented.

18 Claims, 4 Drawing Sheets fuel threshold for activation of energy-conservation protocol
    1/2 tank
    1/4 tank
    1/8 tank
    1/10 tank
    other _
battery power threshold for activation of energy-conservation protocol
    1/2 full charge
    1/4 full charge
    1/8 full charge
    other _
Heating/air conditioning
    disable air conditioning
    decrease blower speed
    activate re-circulation
    Minimum Temp. _
    Maximum Temp. _
    Turn off climate controls to unoccupied seats
entertainment systems
    disable DVD player
    Lower maximum radio/stereo volume
    disable CD player
    disable Sirius/XM/internet radio
disable selected driver assistance/autonomous control systems
    Adaptive cruise control
    Lane keeping
Throttle control/speed
    Vehicle can travel at speeds up to _ MPH below applicable speed limit
Internal power for user devices
    disable Cigarette lighter
    disable A/C power outlets
    disable USB ports
Vehicle internet/WAN capability
EXTERIOR LIGHTING
    disable daytime running lights
    disable other exterior lights
    dim other exterior lights
    disable high beams
INTERIOR LIGHTING
    Disable interior lighting
    dim interior lighting when activated
retract exterior mirrors
draft behind other vehicles

FIG. 3

DEVICE AND/OR SYSTEM DEACTIVATION FOR ENERGY EFFICIENCY IMPROVEMENTS IN VEHICLE

TECHNICAL FIELD

The embodiments described herein relate to energy conservation measures in vehicles.

BACKGROUND

Currently, vehicle fuel and/or electric charge levels may be monitored and displayed to a driver. However, during operation, vehicles may encounter low-fuel or low-electric charge situations. Additionally, the vehicle may not be able to reach a gas station or charge station readily (for example, the vehicle may be caught in a traffic jam). In such situations, the driver may not realize that fuel or energy savings could be implemented by deactivating or disabling certain vehicle systems, and may not even realize that these systems are currently activated.

SUMMARY

In one aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to: determine if a vehicle fuel level or battery power level is below a predetermined threshold; if the vehicle fuel level or battery power level is below the predetermined threshold, determine if at least one energy conservation measure has been pre-selected by a user; if at least one energy conservation measure has been pre-selected by a user, determine whether or not a user approves implementation of the at least one energy conservation measure; and if a user approves implementation of the at least one energy conservation measure, implement the at least one energy conservation measure.

In another aspect of the embodiments of the described herein, a computing system for a vehicle is provided. The computing system includes one or more processors for controlling operation of the computing system, and a memory for storing data and program instructions usable by the one or more processors. The one or more processors are configured to execute instructions stored in the memory to: determine if a vehicle fuel level or battery power level is below a predetermined threshold; if the vehicle fuel level or battery power level is below the predetermined threshold, determine if at least one user-defined energy conservation profile is available; if at least one user-defined energy conservation profile is available, determine whether or not a user approves implementation of at least a portion of the at least one user-defined energy conservation profile; and, if a user approves implementation of at least a portion of the at least one user-defined energy conservation profile, implement the at least a portion of the at least one user-defined energy conservation profile.

In another aspect of the embodiments of the described herein, a method of controlling a vehicle to conserve energy is provided. The method includes steps of determining that a vehicle fuel level or battery power level is below a predetermined threshold and, responsive to the determination and upon approval by a user, implementing at least one energy conservation measure.

In another aspect of the embodiments of the described herein, a non-transitory computer readable medium is provided. The medium has stored therein instructions executable by a computer system to cause the computer system to perform functions including: determining if a vehicle fuel level or battery power level is below a predetermined threshold; if the vehicle fuel level or battery power level is below the predetermined threshold, determining at least one energy conservation measure has been pre-selected by a user; if at least one energy conservation measure has been pre-selected by a user, determining whether or not a user approves implementation of the at least one energy conservation measure; and if a user approves implementation of the at least one energy conservation measure, implementing the at least one energy conservation measure.

BRIEF DESCRIPTION OF THE DRAWINGS

FIG. 3 illustrates a sample of a list of energy conservation options which may be presented to a user via an interactive display or menu, upon request.

DETAILED DESCRIPTION

Figure 1:
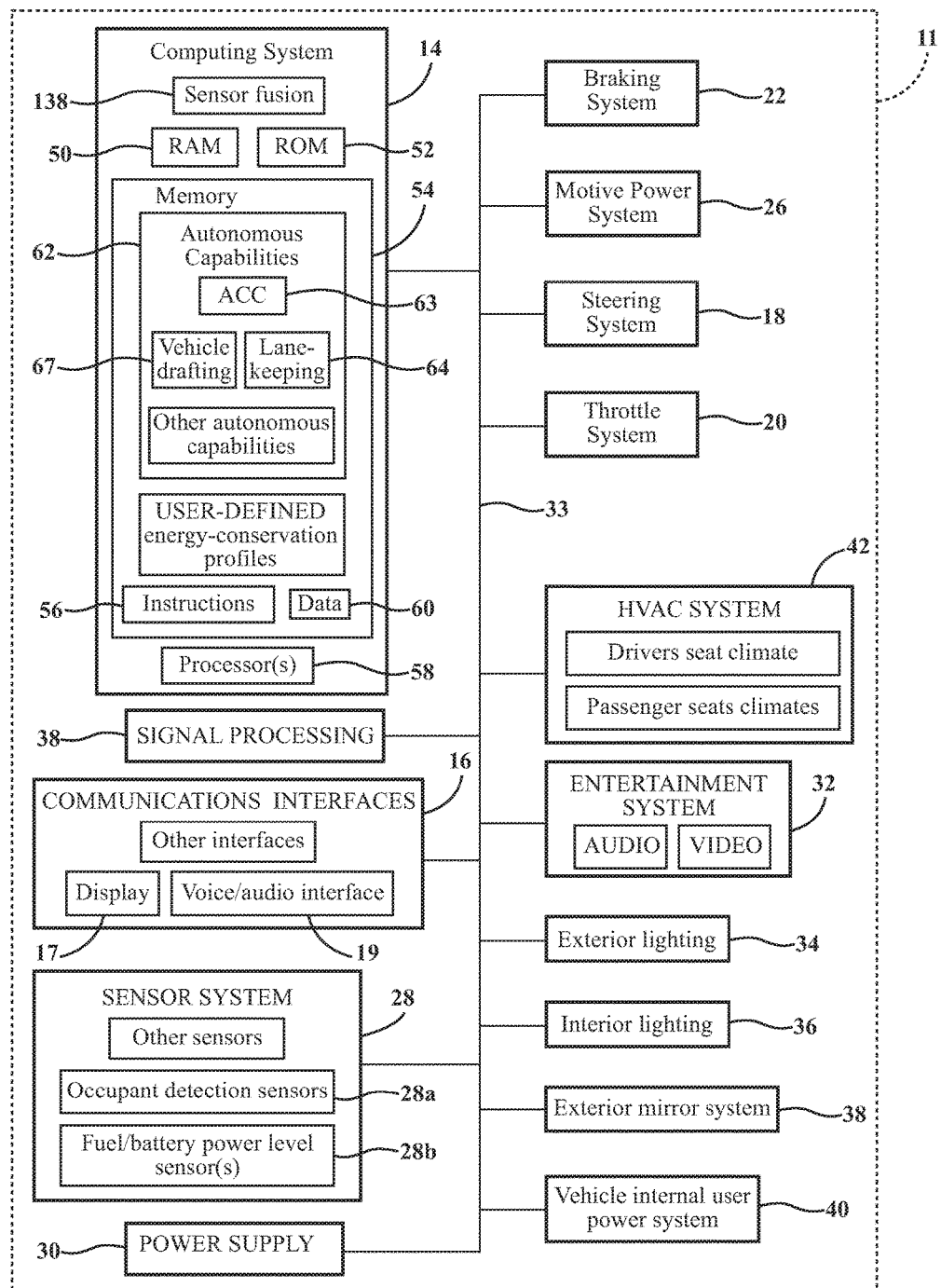
FIG. 1 is a functional block diagram illustrating a vehicle in accordance with an example embodiment described herein.

The embodiments described herein relate to a vehicle and vehicle control system configured to automatically deactivate/disable (or to suggest deactivation/disabling) one or more devices and/or systems in a vehicle as energy conservation measures if the vehicle detects that fuel or electric charge in the vehicle is critically low. The system may be configured to enable an occupant to specify that no energy-conservation measures will be implemented without active approval of such measures by a vehicle occupant. The system may also be configured to present options enabling an occupant to specify a detailed and personalized, individual hierarchy of energy-conservation priorities, in the event implementation of energy-conservation measures is needed to conserve power. These user preferences may be stored as a user-defined energy-conservation profile which will be implemented (upon user approval) to help reduce vehicle energy usage in a low-fuel/energy situation.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Also disclosed herein are non-transitory computer readable media with stored instructions. The instructions could be executable by a computing system or device to cause the computing system or device to perform functions similar to those described in the methods described below.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data, instructions or events as described herein may be transferred between a source and a destination in the form of electromagnetic waves traveling through signal-conducting media such as metal wires, optical fibers, and/or wireless transmission media (e.g., air and/or space).

FIG. 1 is a functional block diagram illustrating a vehicle 11 in accordance with an example embodiment. The vehicle 11 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 11 may be configured to operate fully or partially in an autonomous mode. While in autonomous mode, the vehicle 11 may be configured to operate without human interaction. For example, in an autonomous mode in which an adaptive cruise control (ACC) system is activated, the vehicle may operate the throttle, braking and other systems so as to maintain a safe distance from a vehicle traveling ahead of the ego-vehicle, without input from a vehicle occupant.

The vehicle 11 may include various systems, subsystems and components in operative communication with each other, such as a sensor system or array 28, a computing system 14, one or more communications interfaces 16, a steering system 18, a throttle system 20, a braking system 22, a power supply 30, a motive power system 26, and other systems and components needed for operating the vehicle as described herein. In the example shown in FIG. 1, the vehicle also includes a heating, ventilation and air conditioning (HVAC) system (42), an entertainment system 42, an exterior lighting system 34, an interior lighting system 36, an exterior mirror system 38, and may also include other systems (not shown). The vehicle 11 may include more or fewer subsystems and each subsystem could include multiple elements. Further, each of the subsystems and elements of vehicle 11 could be interconnected. Thus, one or more of the described functions of the vehicle 11 may be divided up into additional functional or physical components or combined into fewer functional or physical components. In some further examples, additional functional and physical components may be added to the examples illustrated by FIG. 1.

For example, the exterior mirror system 38 includes vehicle exterior mirrors (not shown). These mirrors may be extendably retractably mounted in housings along the vehicle exterior. The housings may be aerodynamically shaped so as to reduce drag. When not in use, the exterior mirrors may then be retracted into the housings, to reduce drag and help conserve energy. The entertainment system 32 may include any audio and/or visual devices (for example, DVD players, radios, associated speaker systems,) usable for entertainment by the vehicle occupants. The vehicle internal user power system 40 includes elements such as the cigarette lighter, A/C power outlets, USB ports, and similar features.

The sensor system 28 may include a number of sensors configured to sense information about an external environment of the vehicle 11. For example, the sensor system 28 may include a navigation unit such as a Global Positioning System (GPS), an inertial measurement unit (IMU), a RADAR unit, a laser rangefinder/LIDAR unit, and one or more cameras comprising devices configured to capture a plurality of images of the interior of the vehicle and/or an external environment of the vehicle 11. The camera(s) 130 may be still cameras or video The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth.

The sensor system 28 may also include sensors configured to monitor internal systems, components, and/or conditions of the vehicle 11 (e.g., an $O_2$ monitor, a fuel gauge, an engine oil temperature). Other sensors are possible as well. One or more of the sensors included in the sensor system 104 may be configured to be actuated separately or collectively in order to modify a position, an orientation, or both, of the one or more sensors.

In a known manner, the vehicle sensors 28 provide data used by the computing system 14 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities incorporated into the vehicle 11.

The sensor system 28 can include any suitable type of sensor. Various examples of different types of sensors will be described herein. However, it will be understood that the embodiments are not limited to the particular sensors described. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

The sensor system 28 may include various types of sensors in communication with other control system components, for providing feedback on operations of the vehicle. For example, sensors 28 may detect and store data corresponding to the vehicle's location (e.g., GPS coordinates), speed and direction, rates of acceleration or braking, and specific instances of sudden acceleration, braking, and swerving. Sensors 28 also may detect and store data received from the vehicle's internal systems, relating to such factors as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 28 may detect and store information relating to external driving conditions, for example, external temperature, rain, snow, light levels, and sun position for driver visibility. For example, external cameras and proximity sensors 28 may detect other nearby vehicles, traffic levels, road conditions, traffic obstructions, animals, cyclists, pedestrians, and other conditions that may factor into a driving event data analysis. Sensors 28 also may detect and store data relating to moving violations and the observance of traffic signals and signs by the vehicle. Additional ones of sensors 28 may detect and store data relating to the maintenance of the vehicle, such as the engine status, oil level, engine coolant temperature, odometer reading, the level of fuel in the fuel tank and/or the battery or electrical power level in a gas-hybrid vehicle (for example, fuel/battery power level sensors 28c), engine revolutions per minute (RPMs), and/or tire pressure. Additional ones of sensors 28 may detect the orientation of the driver seat (for example, whether the driver seat is facing toward a front of the vehicle or is swiveled or rotated so as to face in another direction). Additional ones of sensors 28 may detect an angular orientation of a seat back of the driver's seat, to determine if the seat back is upright or reclined. Additional ones of sensors 28 may detect the presence or absence of a driver's hands on the vehicle steering wheel, the presence or absence of a vehicle occupant in a particular seat (for example, occupant detection sensors 28a), and the presence or absence of the driver's feet on one or more of the accelerator, brake and clutch pedals.

Vehicle sensors 28 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 28 also may be configured to collect data a driver's movements or the condition of a driver. For example, vehicle 11 may include sensors that monitor a driver's movements, such as the driver's eye position and/or head position, whether the driver's eyes are on the road, etc. Additional ones of sensors 28 may collect data regarding the physical or mental state of the driver, such as fatigue or intoxication, or whether the driver is asleep. The condition of the driver may also be determined through the movements of the driver or through other sensors, for example, sensors that detect the direction in which the driver's eyes are facing or which detect the content of alcohol in the air or blood alcohol content of the driver, such as a breathalyzer. These sensors may be operatively coupled to a driver monitoring system or routine incorporated into computing system 14.

Certain of vehicle sensors 28 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data. Any data collected by vehicle sensors 28 may also be transmitted to any vehicle system or component requiring or utilizing the data for the purposes described herein. For example, the data collected by vehicle sensors 28 may be transmitted to computing system 14, or to one or more specialized system or component controllers (not shown). Additional particular types of sensors may include any other types of sensors needed to perform the functions and operations described herein.

Information from particular vehicle sensors may be processed and used to control more than one vehicle system or component. For example, in a vehicle incorporating both automated steering and braking control, various road condition sensors may provide data to the computing system to enable the computing system to process the road condition information in accordance with stored processor-executable instructions, and to formulate appropriate control commands to both the steering system and braking system.

If a sensor output signal or other signal requires pre-processing prior to use by the computing system or another vehicular (or extra-vehicular) system or element, a known or suitable processing means (for example, an analog-to-digital (A/D) converter or digital-to-analog (D/A) converter) may be introduced between the sensor system (or the pertinent sensor(s)) and the pertinent system/element or incorporated into the pertinent system/element. Similarly, if operation of any actuatable sub-system or sub-system components (for example, components of the steering system or throttle system) will require processing of a control signal received from the computing system prior to use, a known or suitable processing means may be introduced between the computing system and the actuatable sub-system components or incorporated into the sub-system.

The sensor fusion algorithm 138 may be an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or other algorithm. The sensor fusion algorithm 138 may further provide various assessments based on data from the sensor system 104. In an example embodiment, the assessments may include evaluations of individual objects or features in the environment of the vehicle 11, evaluation of a particular situation, and evaluate possible impacts based on the particular situation. Other assessments are possible. The sensor fusion algorithm 138 may be stored on a memory (such as memory 54) incorporated into or in operative communication with computing system 14 of another computing system or device, may be executed by the associated computing system or device, in a manner known in the art.

The use of "continuously" when referring to the reception, gathering, monitoring, processing, and/or determination of any information or parameters described herein means that the computing system 14 is configured to receive and/or process any information relating to these parameters as soon as the information exists or is detected, or as soon as possible in accordance with sensor acquisition and processor processing cycles. For example, a failure of a sensor used for automated vehicle control may become known when a test signal transmitted through the sensor produces a negative result, or when the automated system employing the sensor attempts to use the sensor for vehicle control. As soon as the computing system 14 receives data from sensors or information relating to the status of a vehicle component for example, the computing system acts in accordance with stored programming instructions. Similarly, the computing system may receive and process an ongoing or continuous flow of information from sensor system 28 and from other information sources. This information is processed and/or evaluated in accordance with instructions stored in a memory, in a manner and for the purposes described herein.

The computing system 14 may be operatively connected to the other vehicle systems and elements and otherwise configured so as to affect control and operation of the vehicle 11 and its components as described herein. The computing system 14 may be configured to control at least some systems and/or components autonomously (without user input) and/or semi-autonomously (with some degree of user input). The computing system may also be configured to control and/or execute certain functions autonomously and/or semi-autonomously. The computing system 14 may additionally or alternatively include components other than those shown and described.

The computing system 14 may control the functioning of the vehicle 11 based on inputs and/or information received from various subsystems (e.g., motive power system 26, sensor system 28, steering system 18, etc.), from any of the communications interfaces 16, and/or from any other suitable source of information. In an example embodiment, the computing system 14 could be operable to provide control over many aspects of the vehicle 11 and its subsystems.

FIG. 1 illustrates a block diagram of an exemplary computing system according to one or more illustrative embodiments of the disclosure. The computing system 14 may have some or all of the elements shown in FIG. 1. In addition, the computing system 14 may also include additional components as needed or desired for particular applications. The computing system 14 may also represent or be embodied in a plurality of controllers or computing devices that may process information and/or serve to control individual components or subsystems of the vehicle 11 in a distributed fashion. Many or all of the functions of the vehicle 11 could be controlled by the computing system 14.

The computing system 14 may include one or more processors 58 (which could include at least one microprocessor) for controlling overall operation of the computing system 14 and associated components, and which executes instructions stored in a non-transitory computer readable medium, such as the memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. For instance, the processor(s) 58 can be part of an electronic control unit (ECU).

In some embodiments, the computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM (Random Access Memory), a PROM (Programmable Read-Only Memory), an EPROM (Erasable Programmable Read-Only Memory), a FLASH-EEPROM (Electrically Erasable Programmable Read-Only Memory), any other memory chip or cartridge, or any other medium or any combination thereof from which computer programmable instructions or code can read. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

The memory 54 may contain data 60 and/or instructions 56 (e.g., program logic) executable by the processor(s) 58 to execute various functions of the vehicle 11, including those described above in connection with FIG. 1. The memory 54 may contain additional instructions as well, including instructions to transmit data to, receive data from, interact with, or control one or more of the vehicle systems and/or components described herein (for example, motive power system 26, sensor system 28, computing system 14, and the communication interfaces 16). In addition to the instructions 56, the memory 54 may store data such as roadway maps, path information, among other information. Such information may be used by the vehicle 11 and the computer system 14 at during the operation of the vehicle 11 in the autonomous, semi-autonomous, and/or manual modes.

The computing system 14 may be configured to coordinate control of the various actuatable vehicle systems and components so as to implement one or more autonomous vehicle control capabilities including autonomous driving assistance capabilities (generally designated 62). These autonomous capabilities 62 may be stored in memory 54 and/or in other memories and implemented in the form of computer-readable program code that, when executed by a processor, implement one or more of the various processes, instructions or functions described herein. A driving assistance capability may be defined as a capability which assists a driver in operating the vehicle by performing one or more functions which may be performed by the driver if the capability is absent or deactivated. Examples of driving assistance capabilities include adaptive cruise control (ACC) 63, lane-keeping 64, and vehicle drafting 67.

An adaptive cruise control capability 63 may be defined as a cruise control system that automatically adjusts the vehicle speed to maintain a safe distance from vehicles ahead, based in information from onboard vehicle sensors.

Thus, responsive to inputs from the vehicle sensors, for example, the computing system 14 may control the throttle system, braking system, motive power system and any other pertinent systems as required to implement the ACC functions. A Lane Keeping capability 64 may be defined as a system designed to alert the driver when the system detects that the vehicle is about to leave or deviate from a traffic lane. Thus, responsive to inputs from the vehicle sensors, for example, the computing system 14 may control the steering and other pertinent systems as required to implement the lane-keeping functions.

In one or more arrangements, the computing system 14 described herein can incorporate artificial or computational intelligence elements, e.g., neural network, fuzzy logic or other machine learning algorithms. Further, in one or more arrangements, the hardware and/or software elements configured for performing particular functions or operations described herein may be distributed among a plurality of elements and/or locations. In addition to computing system 14, the vehicle may incorporate additional computing systems and/or devices (not shown) to augment or support the control functions performed by computing system 14, or for other purposes.

Communications interfaces 16 may be configured to allow interaction between the vehicle 11 and external sensors, other vehicles, other computer systems, various external messaging and communications systems (such as a satellite system or cellular phone/wireless communication system) and/or a user. The communications interfaces 16 may include a user interface for providing information to or receiving input from a user of the vehicle 11. For example, the communications interfaces 16 may include a voice/audio interface 19 (for example, a microphone and speaker for providing audio input and output), keypad, touch screen, and/or stylus through which a user of the computing system 14 may provide input, and may also include and a video display device 17 for providing textual, audiovisual and/or graphical output from the computing system. The computing system 14 may be configured to interpret or process any received audio input as a response to a query or an instruction for the computing system. The user interface may control or enable control of content and the layout of interactive images that may be displayed on the display. A display in the form of a touch screen may provide information to a user of the vehicle 11. The user interface could also be operable to accept input from the user via the touch screen. The touch screen may be configured to sense at least one of a position and a movement of a user's finger via capacitive sensing, resistance sensing, or a surface acoustic wave process, among other possibilities. The touch screen may be capable of sensing finger movement in a direction parallel or planar to the touch screen surface, in a direction normal to the touch screen surface, or both, and may also be capable of sensing a level of pressure applied to the touch screen surface. The touch screen may be formed of one or more translucent or transparent insulating layers and one or more translucent or transparent conducting layers. The touch screen may take other forms as well.

The display can be any other suitable type of display. For instance, the display can be a liquid crystal display (LCD), a light emitting diode (LED) display or some other suitable display. In one or more arrangements, the display can be a heads-up display, a display for a navigation system, and/or a display included in an instrument cluster. The display(s) can be provided in any suitable location within the vehicle 11.

Computing system 14 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with computing system 14 may include devices installed in vehicles, mobile devices that may travel within vehicles, or devices outside of vehicles that are configured to receive and process vehicle and driving data. Thus, any terminals or devices in communication with the computing system 14 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband and the like)(not shown), and may include some or all of the elements described above with respect to the computing system 14. In addition, any of these device embodiments may include a haptic interface or may be configured to provide haptic feedback to a vehicle occupant to inform the occupant of any information or condition which should be communicated to the occupant.

The communications interfaces 16 may also include interfaces enabling communication in a wide area network (WAN), a wireless telecommunications network, and/or other communications networks. The network(s) described herein can be implemented as, or include, without limitation, a dedicated short-range communication (DSRC) network, a wide area network (WAN), a local area network (LAN), the Public Switched Telephone Network (PSTN), a wireless network, a mobile network, a Virtual Private Network (VPN), the Internet, and/or one or more intranets. The communication network(s) further can be implemented as or include one or more wireless networks, whether short or long range. For example, in terms of short range wireless networks, the communication network(s) can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) can include a mobile, cellular, and or satellite-based wireless network and support voice, video, text, and/or any combination thereof. Examples of long range wireless networks can include GSM, TDMA, CDMA, WCDMA networks or the like. The communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and the vehicle 11 and any nearby roadside communications nodes and/or infrastructure.

When used in a WAN networking environment, the computing system 14 may include (or be operatively connected to) a modem or other means for establishing communications over the WAN, such as network (e.g., the Internet).

When used in a wireless telecommunications network, the computing system 14 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information relating to vehicle operating conditions from external various sources.

The vehicle 11 may include various actuatable sub-systems and elements in operative communication with computing system 14 and other vehicle systems and/or components, and which are operable (at least to some degree) responsive to control commands received from the computing system. Various actuatable sub-systems and elements may be controlled manually or automatically (by computing system 14) depending on such factors as a given driving situation and/or whether autonomous driving assistance systems (for example, ACC and/or lane keeping) are activated.

The steering system may include such elements as the vehicle wheels, rack-and-pinion steering gears, steering knuckles, and/or any other elements or combination of elements that may be operable to adjust the heading of vehicle 11.

The wheels (not shown) of the vehicle 11 may be tires. The wheels of the vehicle 11 may be configured in various formats, including a unicycle, bicycle, tricycle, or a four-wheel format, such as on a car or a truck, for example. Other wheel geometries are possible, such as those including six or more wheels. Any combination of the wheels of vehicle 11 may be operable to rotate differentially with respect to other wheels. The wheels may represent at least one wheel that is operatively coupled to the transmission (not shown) and at least one tire coupled to a rim of the wheel that could make contact with the driving surface. The wheels may include a combination of metal and rubber, or another combination of materials.

The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The engine may be any combination of an internal combustion engine, an electric motor, steam engine, Stirling engine, or other types of engines or motors. In some example embodiments, the motive power system 26 may include multiple types of engines or motors. For instance, a gas-electric hybrid car could include a gasoline engine and an electric motor. Other examples are possible. The transmission may include elements that are operable to transmit mechanical power from the engine to the wheels. To this end, the transmission could include a gearbox, a clutch, a differential, and drive shafts. The transmission may include other elements. The drive shafts may include one or more axles that could be coupled to the one or more vehicle wheels. The braking system 22 could include any combination of elements and/or mechanisms configured to decelerate the vehicle 11. The braking system 22 could use friction to slow the wheels. In other embodiments, the braking system 22 may convert the kinetic energy of the wheels to electric current. The braking system 22 may take other forms as well. The throttle system may include elements and/or mechanisms (for example, an accelerator pedal) configured to control, for instance, the operating speed of the engine and, in turn, control the speed of the vehicle 11. FIG. 1 shows just a few examples of vehicle sub-systems 18, 20, 22, 26 which may be incorporated into a vehicle. A particular vehicle may incorporate one or more of these systems or other systems (not shown) in addition to one or more of the systems shown.

The power supply 30 may provide power to various components of the vehicle 11 and could represent, for example, a rechargeable lithium-ion or lead-acid battery. In some embodiments, one or more banks of such batteries could be configured to provide electrical power. Other power supply materials and configurations are possible. In some embodiments, the power supply 30 and the energy source (not shown) could be implemented together, as in some all-electric cars.

The vehicle 11 may be configured so that the computing system 14, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through a physical medium (such as wired connections) or the connections may be wireless connections.

Although FIG. 1 shows various components of vehicle 11, computing system 14, memory 54, and communications interfaces 16, as being integrated into the vehicle 11, one or more of these components could be mounted or associated separately from the vehicle 11. For example, memory could, in part or in full, exist separate from the vehicle 11. Thus, the vehicle 11 could be provided in the form of device elements that may be located separately or together. The device elements that make up vehicle 11 could be communicatively coupled together in a wired or wireless fashion.

The embodiments described herein relate to a vehicle and vehicle control or computing system configured to initiate implementation of an energy-conservation protocol if the vehicle detects that fuel or electric charge in the vehicle is critically low. Implementation of the protocol may involve user-approved implementation of one or more energy-conservation measures which have been pre-selected and, optionally, prioritized in accordance with user preferences. In one form, these selected energy-conservation measures are stored as a user-defined (i.e., driver or passenger-defined) energy-conservation profile containing instructions regarding automatically deactivating/disabling (and/or providing suggestions to the user regarding deactivating/disabling) one or more devices and/or systems in a vehicle as energy conservation measures. The energy-conservation profile is then a storable and accessible record including a list of the user-selected conservation measures and their associated priorities (if any). However, the user-selected conservation measures may be stored in any other suitable form allowing access and review by a user and implementation as described herein. The system may be configured to enable a user to specify that no energy-conservation measures will be implemented without active approval of such measures by a vehicle occupant. The system may also be configured to present options enabling a user to specify a detailed and personalized, individual hierarchy of energy-conservation priorities, in the event implementation of energy-conservation measures is needed to conserve power. These user preferences may be stored as a user-defined energy-conservation profile which may be implemented (upon user approval) to help reduce vehicle energy usage in a low-fuel/energy situation.

The following description details one method of setting up or generating a user-defined energy-conservation profile. Suitable alternative methods may also be used. The vehicle 11 may include systems and communications interfaces enabling a user to interact with computing system 14 so as to generate, view, and modify user energy-conservation profiles as described herein, for example, using wired or wireless connections.

FIG. 3 shows a sample of a list of energy conservation options which may be presented to a user via an interactive display or menu, upon request. Options other than (or in addition to) those shown may be offered. Also, fewer options may be offered depending on the capabilities of a particular vehicle design. The user may select one or more energy-conservation parameters or measures from the menu for incorporation into an energy-conservation profile. The selected measures will be saved as a user-defined energy conservation profile. The selected measures will be controlled during implementation of the profile so as to conserve energy if a low-fuel condition occurs.

The computing system may be configured to, during implementation of the energy-conservation profile, control the various vehicle systems and components so as to control the parameters shown in the menu, to conserve energy usage by the vehicle. Generation of a new energy-conservation profile and menu call-up may be initiated by the user using the display or other interface. The display may be an in-vehicle display (for example, a touch screen), on a cellular or wireless device, on a personal computer, or any other interactive display. The user may choose measures by touching an appropriate field on a touch screen, for example. The user may enter desired values into various blank fields (for example, minimum and maximum interior temperature as controlled by the vehicle environmental control system). For example, the user may specify that a maximum speed of the vehicle be restricted to a predetermined amount below the applicable speed limit. Thus, if the speed limit for the road on which the vehicle is traveling is 60 miles per hour (MPH), and the user specifies a limit of 5 MPH below the limit, the vehicle may be controlled to limit its speed to a maximum of 55 MPH. This energy-conservation measure may be implemented through automated control of the throttle system 20.

The computing system 14 may be configured to determine an applicable speed limit for the road on which the vehicle is traveling. This may be done using a camera system incorporated into the sensor system and an associated character recognition routine incorporated into the computing system. Alternatively, the speed limit information may be determined using stored or available map information from a vehicle navigation system, such as a GPS system or using any other suitable method.

In another example, the user may instruct the vehicle to draft behind another vehicle immediately in front of it as an energy-conservation measure. "Drafting" as used herein may be defined as driving close behind another car so as to benefit from the reduction in air pressure created behind the car ahead. This measure may be implemented, for example, by an autonomous drafting capability 67. The autonomous drafting capability 67 may be stored in memory 54 and/or in other memories and implemented in the form of computer-readable program code that, when executed by a processor, implement one or more of the various processes, instructions or functions described herein. The drafting capability 67 may control of the throttle system 20, braking system 22 and any other pertinent systems in a manner similar to that exercised during implementation of the adaptive cruise control (ACC) capability. The drafting capability may control the vehicle so as to minimize the following distance behind the lead vehicle, while maintaining a safe following distance for a given speed. In cases where the vehicle can no longer follow a particular lead vehicle, the drafting capability 67 may operate the vehicle to, as soon as possible, locate another which may be followed and to maneuver the vehicle into a suitable following position behind the new leading vehicle.

In another example, the user may instruct the vehicle to control a maximum and/or a minimum temperature to be provided in at least a portion of the vehicle as one of the energy conservation measures. In a vehicle HVAC system 42 where the driver and passenger seats have individual climate controls, the designated maximum and/or a minimum temperature may be applied to one or more of the seat, or to all of the seats. In addition, the vehicle may be configured to (using a suitable seat of occupant detection sensor 28a) detect when a given vehicle seat is empty and shutoff or deactivate any blowers or climate control functions directed to the given seat.

The designated maximum and/or a minimum temperature may also be applied to the entire vehicle interior. For example, the user may specify a maximum vehicle interior or climate control zone temperature to be 65° F. for a cold winter day. Thus, the vehicle heating system would heat the interior or designated zone only until the temperature reached 65° F. When this temperature is reached, the heating system would shut off.

In another example, the user may instruct the vehicle to deactivate or disable implementation of one or more autonomous driver assistance systems or capabilities as one of the energy conservation measures. In the example shown, the vehicle incorporates an adaptive cruise control (ACC) capability 63 and a lane-keeping capability 64. The user may elect to deactivate to prevent activation of one or more of these capabilities. In cases where the capability is being used at the time the low-fuel/energy condition is received, the computing system may generate a notification to the user (prior to deactivation of a driving assistance system) indicating that the system is about to be deactivated, and informing the user of any additional levels of vehicle control that must be exercised by the user. For example, if the lane-keeping capability is active when the low-fuel/energy notification is received, the user may be informed that an additional level of manual steering control must be exercised by the user to stay in a desired lane.

In another example, the vehicle may incorporate exterior mirrors which are extendible from (and retractable into) aerodynamically efficient housings positioned along the vehicle exterior as previously described. Alternatively, one or more mirror housings may be built into vehicle panels so as to be flush with exterior surfaces of the panels when the mirrors are retracted. The user may specify that these exterior mirrors will be retracted as one of the energy conservation measures.

After the user has selected the capabilities, systems, and/or components to be controlled, the selected features may be displayed on a summary screen, which echoes all of the selected features for user verification. In a particular embodiment, the user may have the option of interactively prioritizing the items shown on the summary screen, by moving the features (using a touch-and-drag capability of a touch screen, for example) to positions in the list according to preference, by numbering the features, or using any other suitable means. This order of preference may determine the order in which the features will be offered to a user for execution if a low-fuel condition occurs and the user does not wish to implement all of the features on the summary list at the same time.

After the user has confirmed the features selections (and, optionally, prioritized the features), the summary list may be saved in a memory (such as memory 54) as a profile for the particular user. The user may enter a name or other identification to be attached to the profile. This enables a single user to have multiple energy-conservation profiles and also enables multiple users to have one or more profiles stored in memory. In a particular embodiment, a user may create an energy-conservation profile and then attach a name or designation to the profile. The user can then later specify to the computing system 14 the profile to be implemented by referring to its designation. In a particular embodiment, one or more of the user-defined energy-conservation profiles may be stored in an extra-vehicular location (i.e., outside the vehicle, for example in a remotely located database or memory accessible by wireless communication).

In a particular embodiment, the user may be enabled to specify either that the energy-conservation measures listed in the profile will be automatically implemented upon the occurrence of a low-fuel/energy condition, or that none of the measures listed in the profile will be implemented without explicit approval of a user.

To modify a user profile, the user profile is accessed through the display. The items on the current profile may then be re-ordered as desired, using the interactive display. Alternatively, the user may generate a new profile to replace (or in addition to) the existing profile.

Figure 2:
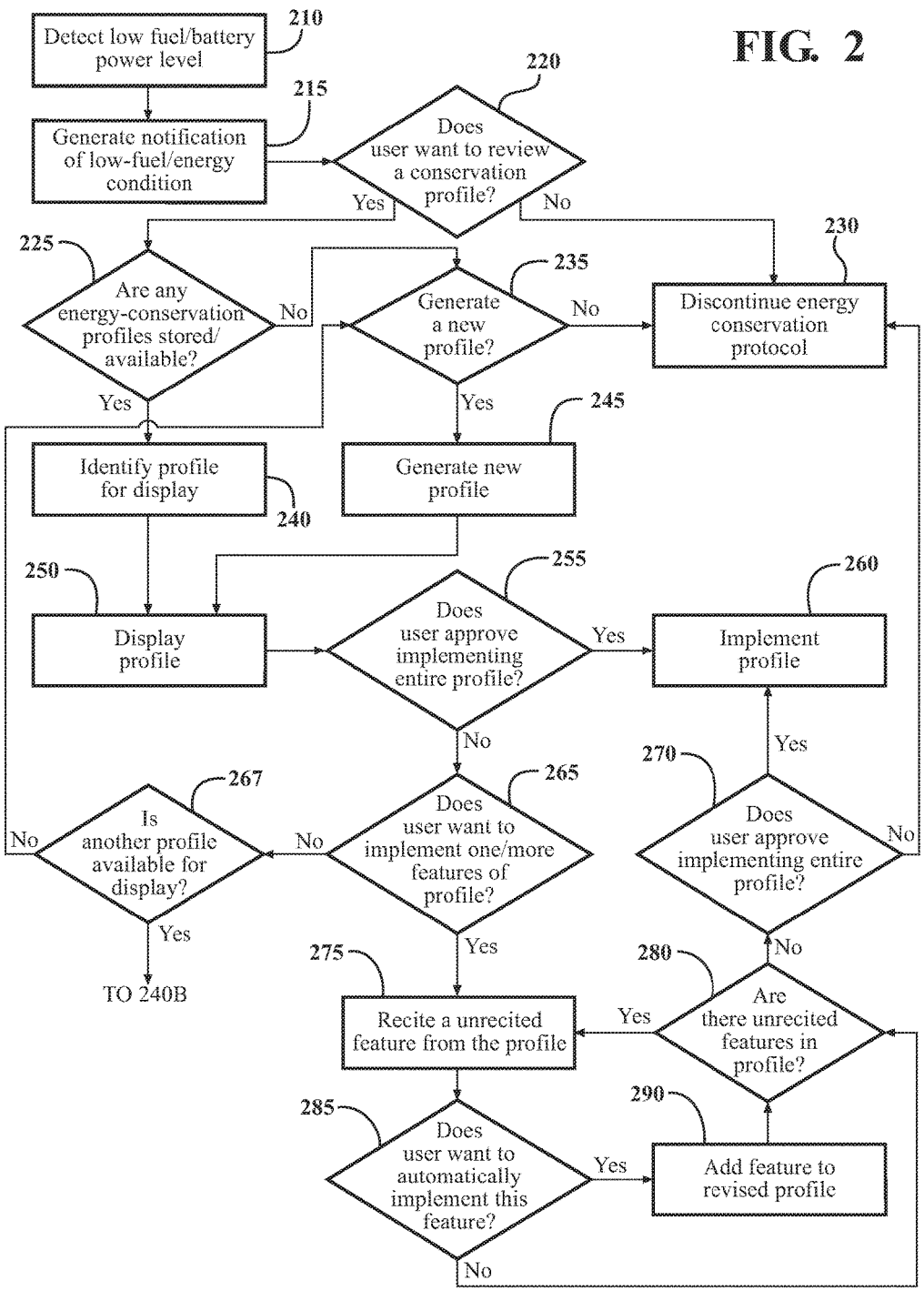
FIG. 2 is a flow diagram illustrating an implementation of an energy-conservation protocol in accordance with an embodiment described herein.
Figure 2A:
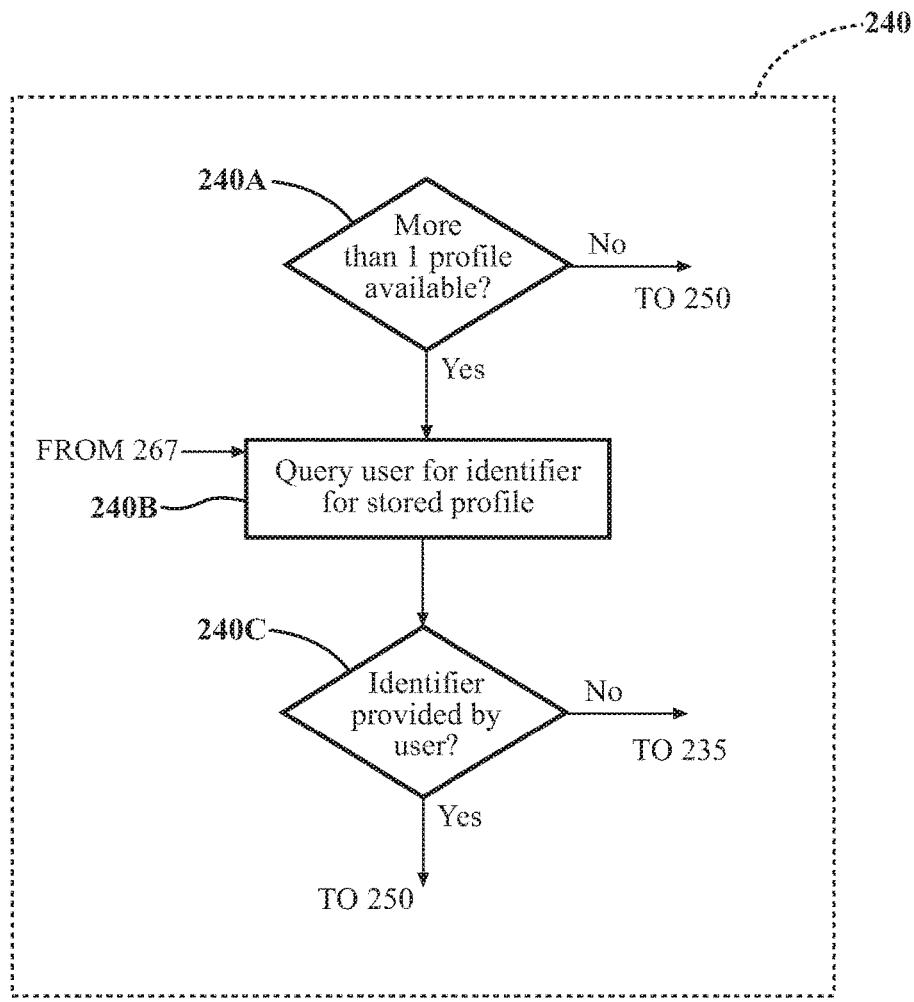
FIG. 2A is a flow diagram illustrating one example of a procedure for identifying an existing energy-conservation profile to display for a user.

FIGS. 2 and 2A show one example of an implementation of an energy-conservation protocol in accordance with one embodiment described herein. The computing system 14 may be configured to constantly monitor vehicle fuel and/or energy levels using one or more suitable sensors in operative communication with the computing systems.

In block 210, the computing system 14 may detect a low-fuel/energy condition in the vehicle. For example, the computing system may detect (through suitable fuel or energy level sensors 28b) that a low-fuel/energy condition exists. The computing system 14 may be configured to activate the energy conservation protocol when a low-fuel/energy condition occurs. The trigger threshold for a low-fuel/energy condition may be specified by a user as previously described. In addition, a default condition may be pre-programmed into the computing system, in the event a user does not specify a preference.

In block 215, upon activation of the protocol, the computing system 14 may generate a notification to be presented on a display (such as an in-vehicle touch screen display) notifying vehicle occupants that a low-fuel condition has occurred, and that an energy-conservation protocol may be implemented upon user approval of an existing (i.e., stored) energy-conservation profile, or upon specification of a new profile by the user. The notification may provide options for responding to the notification.

In block 220, the response by the user may indicate to the computing system whether the user wants to review an energy-conservation profile for possible implementation.

If the user does not wish to review or create any profiles, in block 230 implementation of the energy-conservation protocol may be discontinued.

In block 225, if the user wants to review an energy-conservation profile, the computing device may determine if there are any energy-conservation profiles stored in a vehicle memory or otherwise accessible from an extra-vehicular source.

In block 240, if one or more energy-conservation profiles are stored, the computing system may identify a profile to display for the user. Blocks 240A-240C of FIG. 2A illustrate one example of a procedure for identifying an existing profile to display for a user.

In block 250, if there is only one profile stored or otherwise available, the computing system may display the available profile for user review and approval.

In block 240A, if more than one profile is stored or available, the user may select a profile for display.

In one embodiment, in block 240B, the computing system 14 may prompt the driver or user to state his or her name or another known identifier which may be linked to an existing profile. The request may be in the form of a voice prompt eliciting an audible response from the user, a visual prompt shown on an interactive display (such as a touch screen located in the passenger compartment), or any other suitable form of prompt. To identify an existing profile, the user may input a name of file designation corresponding to a known, saved profile. Other methods may also be used to identify a profile for display. The notification may also provide a user with an option for indicating that the user does not have an identifier or an energy-conservation profile stored in the computing system 14. The computing system 14 may be configured to link the response to a stored energy-conservation profile, if a profile is associated with the name or other identifier in the response. The computing system 14 may be configured to recall and display the profile associated with the driver, in the manner previously described. Any user (driver or non-driver) may recall a stored profile from the computing system for implementation when the protocol is activated.

In block 240C, if the user inputs an identifier for an existing profile, control transfers to block 250, where the profile identified by the user is displayed.

If the user does not input an identifier for an existing profile, control may transfer to block 235. In block 235, the computing system may offer the user an option to immediately generate a profile (using the method previously described) to be implemented (upon approval) in the current driving situation.

Alternatively, the computing system 14 may be configured to, if more than one profile is associated with the user, display the most recently saved or modified profile first. If this profile is not the desired profile, the system may scroll through the stored profiles relating to the user until the user selects a particular one of the profiles.

In block 255, the user is queried as to whether he/she wishes to implement the entire profile.

In block 260, if the user approves the profile for implementation, the computing system may implement the profile (i.e., the computing system may control the various vehicle systems and components so as to control the parameters shown in the profile in accordance with the profile, to conserve energy usage by the vehicle).

In a particular embodiment, prior to implementation of the profile, the computing system may survey and store the existing values and/or states (i.e., the base states) of the control parameters, components, and/or systems set forth in the profile. This enables the parameters for these components and/or systems to be returned to their former states after implementation of the energy-conservation profile is discontinued.

If there are no profiles stored or available, in block 235, the computing system may offer the user an option to immediately generate a profile (using the method previously described) to be implemented (upon approval) in the current driving situation. If the user does not wish to create any profiles, implementation of the energy-conservation protocol may be discontinued in block 230.

In block 250, after a profile has been identified or selected for display, the profile may be displayed for user review and approval. Upon identification of the driver, the preferences saved for the particular driver may be recalled from memory and displayed for user approval prior to implementation. If the user has previously prioritized the measures on the list, the measures may be displayed in order of priority.

After displaying a profile for review and approval, the user may be prompted in block 255 (visually via the display and also audibly via a speaker) to indicate if he/she wants to control all of the measures specified in the profile simultaneously in order to reduce energy consumption.

If the user approves the profile, the computing system may in block 260 automatically implement the profile by controlling all of the measures set forth in the profile so as to minimize or reduce energy consumption.

In block 265, if the user does not wish to implement all of the listed energy-conservation measures at the same time, the user may be queried as to whether he/she wishes to implement any of the measures.

In block 275, if the user wishes to implement any of the measures, the user may be queried as to which measures he/she does want to implement. This may be done, for example, by the computing system generating an audible voice prompt to the user which recites each feature on the list, one at a time.

In block 285, after a feature is recited, the computing system may wait for a user voice response to the prompt. The user may provide a "yes" or "no" reply to each recited feature before the next feature on the list is recited.

In block 290, if the user response is affirmative, the chosen energy-conservation measured may be received and saved to generate a revised profile for purposes of implementation in the current driving situation. In this manner, a user may exercise final approval over the energy-conservation measures implemented in a given driving situation. The procedure set forth in blocks 275-285-290-280 may be continued until all measures listed in the profile have been recited. When the revised profile is complete, the revised profile may be displayed in block 282 prior to implementation for final approval by the user. These procedures enable the user to have an additional level of control over energy-conservation measures, according to the user desired or requirements in the given driving situation. Alternatively, even if the user decides not to have the computing system 14 automatically implement one or more of the energy-conservation measures recited from the list, the user may at any time operate any of the recited systems manually (if they are manually operable) to effect a reduction in energy usage. Thus, the recitation of the elements of the profile may serve as a suggestion to the user regarding energy-conservation measured which may be taken.

Returning to block 265, if the user does not wish to implement any of the energy-conservation measures set forth in the displayed profile, in block 267, another profile may be selected for display (if an undisplayed profile is stored in the memory), using one of the previously described selection methods or another method.

In block 250, the newly selected profile may then be displayed for user review and approval. This process is repeated until the user approves one of the available profiles or disapproves all of the displayed profiles. Implementation of then protocol may then be discontinued.

Referring to block 267, if none of the stored or available profiles are selected by the user for implementation, the computing system may (in block 235) offer the user an option to immediately generate a profile (using the method previously described) to be implemented (upon approval) in the current driving situation. If the user does not wish to generate a new profile, implementation of the protocol may be discontinued in block 230. If the user chooses to generate a new profile, after the new profile is generated (in block 245), control may transfer to block 250, where the new profile is displayed for user review and approval. Control may then transfer to block 255, where the user is queried as to whether he/she wishes to implement the entire profile.

If the computing system 14 detects that the fuel level or power level is no longer below the predetermined threshold required for implementation of the energy-conservation protocol, implementation of any current energy-conservation profile may be automatically discontinued. In addition, the parameters affected by and/or controlled by the computing system for purposes of implementing the profile may be returned to the values or base states they had prior to implementation of the profile.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A computing system for a vehicle, the computing system comprising one or more processors for controlling operation of the computing system, and a memory for storing data and program instructions usable by the one or more processors, wherein the one or more processors are configured to execute instructions stored in the memory to:
   generate a notification enabling a user to pre-select one or more energy conservation measures from a list of measures;
   if more than one energy conservation measure is pre-selected from the list of measures, prompt a user to prioritize each pre-selected energy conservation measure with respect to the other pre-selected energy conservation measures;
   store the prioritized pre-selected energy conservation measures in a memory;
   determine if a vehicle fuel level or battery power level is below a predetermined threshold;
   if the vehicle fuel level or battery power level is below the predetermined threshold, determine if at least one energy conservation measure has been pre-selected by a user;
   if at least one energy conservation measure has been pre-selected by a user, determine whether or not a user approves implementation of the at least one energy conservation measure; and
   if a user approves implementation of the at least one energy conservation measure, control the vehicle to implement the at least one energy conservation measure.

2. The system of claim 1 wherein the one or more processors are configured to execute instructions stored in the memory to:
   if a vehicle fuel level or battery power level is not below a predetermined threshold, determine if at least one energy conservation measure is currently being implemented; and
   if at least one energy conservation measure is currently being implemented, discontinue implementation of the at least one energy conservation measure.

3. The system of claim 1 wherein the one or more processors are configured to execute instructions stored in the memory to and restore each vehicle parameter previously controlled by implementation of the discontinued at least one energy conservation measure to an associated base state.

4. The system of claim 1 wherein the predetermined threshold is a user-determined threshold.

5. The system of claim 1 wherein the threshold is a fuel level corresponding to a volume of fuel equal to one-quarter of a capacity of a vehicle fuel tank.

6. The system of claim 1 wherein the one or more processors are configured to execute instructions stored in the memory to, if a single energy conservation measure is selected from the list of measures, store the selected energy conservation measure in a memory.

7. The system of claim 1 wherein the one or more processors are configured to execute instructions stored in the memory to generate a notification enabling a user to select an amount by which a maximum vehicle speed may be reduced below an applicable speed limit on a road on which the vehicle is traveling, as an energy conservation measure.

8. The system of claim 1 wherein the one or more processors are configured to execute instructions stored in the memory to generate a notification enabling a user to select a maximum and a minimum temperature to be provided in at least a portion of the vehicle as one of the one or more energy conservation measures.

9. The system of claim 1 wherein the one or more processors are configured to execute instructions stored in the memory to generate a notification enabling a user to select deactivating or disabling implementation of one or more autonomous driver assistance capabilities as one of the one or more energy conservation measures.

10. The system of claim 1 wherein the one or more processors are configured to execute instructions stored in the memory to generate a notification enabling a user to select controlling movement of the vehicle so as to draft behind another vehicle as one of the one or more energy conservation measures.

11. The system of claim 1 wherein the one or more processors are configured to execute instructions stored in the memory to generate a notification enabling a user to select retracting vehicle mirrors as one of the one or more energy conservation measures.

12. A vehicle including a computing system in accordance with claim 1.

13. A computing system for a vehicle, the computing system comprising one or more processors for controlling operation of the computing system, and a memory for storing data and program instructions usable by the one or more processors, wherein the one or more processors are configured to execute instructions stored in the memory to:

generate a notification enabling a user to create and save in a memory one or more user-defined energy-conservation profiles associatable with the user;

enable the user to pre-select a user-defined energy-conservation profile from the one or more user-defined energy-conservation profiles prior to occurrence of a situation where a vehicle fuel level or battery power level of the vehicle is a predetermined threshold;

determine if the vehicle fuel level or battery power level is below the predetermined threshold;

if the vehicle fuel level or battery power level is below the predetermined threshold, determine if a user-defined energy conservation profile has been pre-selected;

if a user-defined energy conservation profile has been pre-selected, determine whether or not a user approves implementation of at least a portion of the user-defined energy conservation profile; and if a user approves implementation of at least a portion of the user-defined energy conservation profile, control the vehicle to implement the at least a portion of the user-defined energy conservation profile.

14. The system of claim 13 wherein the one or more processors are configured to execute instructions stored in the memory to:

if a vehicle fuel level or battery power level is not below a predetermined threshold, determine if at least a portion of the user-defined energy conservation profile is currently being implemented; and if at least a portion of the user-defined energy conservation profile is currently being implemented, discontinue implementation of the at least a portion of the user-defined energy conservation profile, and restore each vehicle parameter previously controlled by implementation of the discontinued user-defined energy conservation profile to an associated base state.

15. A method of controlling a vehicle to conserve energy, comprising steps of:

generating a notification enabling a user to pre-select a plurality of energy conservation measures from a list of energy conservation measures;

generating a notification enabling a user to prioritize each pre-selected energy conservation measure with respect to the other pre-selected energy conservation measures;

storing the prioritized plurality of pre-selected energy conservation measures in a memory;

determining that a vehicle fuel level or battery power level is below a predetermined threshold; and responsive to the determination that the vehicle fuel level or battery power level is below a predetermined threshold, and upon approval by a user, controlling the vehicle to implement at least one energy conservation measure of the plurality of prioritized pre-selected energy conservation measures.

16. The method of claim 15 wherein the step of controlling the vehicle to implement at least one energy conservation measure of the plurality of prioritized pre-selected energy conservation measures comprises the steps of:

determining if at least one energy conservation measure has been pre-selected by a user;

if at least one energy conservation measure has been pre-selected by a user, determining whether or not a user approves implementation of the at least one energy conservation measure in a current driving situation;

if a user approves implementation of the at least one energy conservation measure in the current driving situation, implementing the at least one energy conservation measure.

17. A non-transitory computer readable medium having stored therein instructions executable by a computer system to cause the computer system to perform functions, the functions comprising:

generating a notification enabling a user to pre-select one or more energy conservation measures from a list of measures;

if more than one energy conservation measure is pre-selected from the list of measures, prompting a user to prioritize each pre-selected energy conservation measure with respect to the other pre-selected energy conservation measures;

storing the prioritized pre-selected energy conservation measures in a memory;

determining if a vehicle fuel level or battery power level is below a predetermined threshold;

if the vehicle fuel level or battery power level is below the predetermined threshold, determining at least one energy conservation measure has been pre-selected by a user;

if at least one energy conservation measure has been pre-selected by a user, determining whether or not a user approves implementation of the at least one energy conservation measure; and if a user approves implementation of the at least one energy conservation measure, implementing the at least one energy conservation measure.

18. The system of claim 7 wherein the one or more processors are configured to execute instructions stored in the memory to:

determine an applicable speed limit on a road on which the vehicle is traveling;

determine if a user has selected an amount by which the maximum vehicle speed may be reduced below an applicable speed limit on a road on which the vehicle is traveling as an energy conservation measure; and if a user has selected an amount by which the maximum vehicle speed may be reduced below an applicable speed limit on a road on which the vehicle is traveling and the user approves, as a conservation measure, operation of the vehicle to control the vehicle to limit the maximum speed of the vehicle to a speed which is the user-selected amount below the applicable speed limit, control the vehicle to limit the maximum speed of the vehicle to a speed which is the user-selected amount below the applicable speed limit.

\* \* \* \* \*